US 6,574,713 B1

(12) United States Patent
Kosche et al.

(10) Patent No.: US 6,574,713 B1
(45) Date of Patent: Jun. 3, 2003

(54) HEURISTIC FOR IDENTIFYING LOADS GUARANTEED TO HIT IN PROCESSOR CACHE

(75) Inventors: Nicolai Kosche, San Francisco, CA (US); Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 165 days.

(21) Appl. No.: 09/685,431

(22) Filed: Oct. 10, 2000

(51) Int. Cl.[7] ............................................... G06F 12/00
(52) U.S. Cl. ..................... 711/137; 711/117; 711/118; 711/213; 711/202; 711/125
(58) Field of Search ................................ 711/137, 117, 711/125, 118, 204, 209, 218, 220, 4, 3, 123, 213

(56) References Cited

U.S. PATENT DOCUMENTS

| 5,293,609 A | * | 3/1994 | Shih et al. ................... 711/136 |
| 5,530,884 A | | 6/1996 | Sprague et al. .............. 395/800 |
| 5,764,946 A | * | 6/1998 | Tran et al. ................... 711/118 |
| 5,809,566 A | * | 9/1998 | Charney et al. ............. 711/204 |
| 5,822,790 A | * | 10/1998 | Mehrotra ...................... 326/11 |
| 6,119,203 A | * | 9/2000 | Snyder et al. ............... 711/137 |
| 6,219,760 B1 | * | 4/2001 | McMinn ...................... 711/118 |
| 6,295,582 B1 | * | 9/2001 | Spencer ....................... 710/57 |
| 6,314,431 B1 | * | 11/2001 | Gornish ....................... 711/125 |

* cited by examiner

Primary Examiner—Matthew Kim
Assistant Examiner—Zhuo H. Li
(74) Attorney, Agent, or Firm—Park, Vaughn & Fleming, LLP

(57) ABSTRACT

A heuristic algorithm which identifies loads guaranteed to hit the processor cache which further provides a "minimal" set of prefetches which are scheduled/inserted during compilation of a program is disclosed. The heuristic algorithm of the present invention utilizes the concept of a "cache line" (i.e., the data chunks received during memory operations) in conjunction with the concept of "related" memory operations for determining which prefetches are unnecessary for related memory operations; thus, generating a minimal number of prefetches for related memory operations.

36 Claims, 4 Drawing Sheets

HEURISTIC FOR IDENTIFYING LOADS GUARANTEED TO HIT IN PROCESSOR CACHE

BACKGROUND OF THE INVENTION

1. Field of the Invention

This invention pertains generally to software prefetching algorithms. More particularly, the invention is a heuristic algorithm for identifying memory operations guaranteed to hit in the processor cache.

2. The Prior Art

Current computer systems include, among other things, a memory system and a processing unit (or processor or central processing unit (CPU)). A memory system serves as a repository of information, while the CPU accesses information from the memory system, operates on it, and stores it back.

However, it is well known that CPU clock speeds are increasing at a faster rate than memory speeds. When a processor attempts to read a memory location from the memory system, the request is "very urgent". That is, in most computer systems, the processor stalls or waits while the memory system provides the data requested to the CPU. The "latency" of the memory is the delay from when the CPU first requests data from memory until that data arrives and is available for use by the CPU.

A cache is a special high-speed memory in addition to the conventional memory (or main memory). FIG. 1 depicts a conventional hierarchical memory system, where a CPU is operatively coupled to a cache, and the cache is operatively coupled to the main memory. By placing the cache (very fast memory) in front of the main memory (large, slow memory), the memory system is able to satisfy most requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache, and then to the CPU, resulting in greater latency.

To address the problem of latency and to increase the "hit" to "miss" ratio associated with cache memory, many modern computer systems have introduced instructions for prefetching data from memory to cache. For example, instructions set architectures (ISA's), such as SPARC™ V9, support software data prefetch instructions. The details of the implementing prefetch instructions have been left to the designers of optimizing compilers to find ways to reduce the frequency of cache misses.

However, prefetch instructions are costly to execute. Compiler algorithms, which typically implement prefetch insertion for code optimization, should also consider whether insertion of a prefetch for a given memory operation likely to miss the cache would be profitable. For example, in certain processor architectures, the number of in-flight memory operations is typically limited by the size of a "memory queue". Since prefetch instructions occupy space in the memory queue, it would be advantageous to avoid scheduling/inserting prefetches unnecessarily.

Furthermore, in certain processor chip designs, a limited number of memory operations may be issued during an operation cycle. For example, in the ULTRASparc III chip, only one memory operation may be initiated during a given operation cycle. Thus, it would be beneficial to minimize unnecessary memory prefetch scheduling/insertion during program compilation.

BRIEF DESCRIPTION OF THE INVENTION

To overcome these and other deficiencies found in the prior art, disclosed herein is a heuristic algorithm which identifies loads guaranteed to hit the processor cache which further provides a "minimal" set of prefetches which are scheduled/inserted during compilation of a program. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention also relates to a method and use of prefetch instructions to load data from memory into a cache. It is contemplated that the invention may be used for loading data from conventional main memory as well as other "slow" data storage structures such as a disk storage or a network storage, for example. Although, the invention is described herein with respect to a single cache, it is contemplated that any suitable cache arrangement (e.g., various levels of cache) is within the scope of the present invention.

In its most general terms, the invention comprises software for scheduling memory operations to provide adequate prefetch latency. The invention is generally used in conjunction and incorporated into compilation software (compiler), which converts source code into a compiled program (or executable file). During compilation, the source code is converted into an intermediary "program code" which is processed by the compiler. After the compiler has completed processing the program code, a compiled program is generated from the program code.

More particularly, the invention is embodied in a heuristic prefetch scheduler component having a program code parser module and a prefetch scheduler module.

The program code parser module first examines the program code to sort memory operations (such as loads) into two groups: loads that are likely not to miss the cache and loads that are likely to miss the cache. Various algorithms known in the art may be used for carrying out this classification. For the group of memory operations likely to miss the cache, the program code parser module then creates sets of offsets corresponding to "related" memory operations, each related memory operation including a base address and an offset value (i.e., a constant) which may be zero, and each related memory operation further associated with a prefetch instruction.

The prefetch scheduler module operates on the sets of offsets established by the program code parser module to generate a "minimal" number of prefetches associated therewith. The heuristic algorithm of the present invention, which is carried out by the prefetch scheduler module, utilizes the concept of a "cache line". When data is retrieved from memory, the data is retrieved in chunks called cache lines, as is known in the art. The size of the cache line varies from platform to platform. However, in general, the size of the cache line is larger than the size of the data requested during a memory instruction. Accordingly, there may be cases where two or more related memory instructions may reference data in the same cache line, in which case, it may be unnecessary to prefetch data for some memory instructions when an earlier prefetch for a "related" memory instruction has already been carried out. The present invention provides a heuristic algorithm for determining which prefetches are unnecessary for such related memory operations; thus, generating a minimal number of prefetches for related memory operations.

In particular, the prefetch scheduler module sorts the set of offsets established by the program code parser module, typically in ascending order. The prefetch scheduler then generates a prefetch for the lowest (minimum) offset and the highest (maximum) offset. The prefetch scheduler then iterates through the set to determine whether a given offset in the set requires a prefetch. According to the algorithm of the present invention, a prefetch is created for a given (current) offset if the distance from the current offset exceeds the previously generated offset by a threshold value. The threshold value is a heuristically generated arbitrary value and is typically one-fourth (¼) to one-half (½) of the cache line size, although any threshold value not exceeding twice the cache line size or twice the prefetch data size is contemplated for use with the present invention. A threshold is used because the run-time location of the memory address within a cache line is not usually predictable.

According to an alternative embodiment of the algorithm, prefetches are generated at regular intervals of one cache line size between the minimum and maximum offset values (ignoring what the actual intervening offsets are).

The process of the program code parser module and the prefetch scheduler module together identifies loads guaranteed to hit the processor cache (i.e., those memory operations related to other memory operations are "guaranteed" to hit the cache because the prefetches associated with the earlier memory operations bring the data required by the later related memory operations into the cache line).

It is noted that the present invention is suitable for use during one or more processes during the compilation process to optimize the program code.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
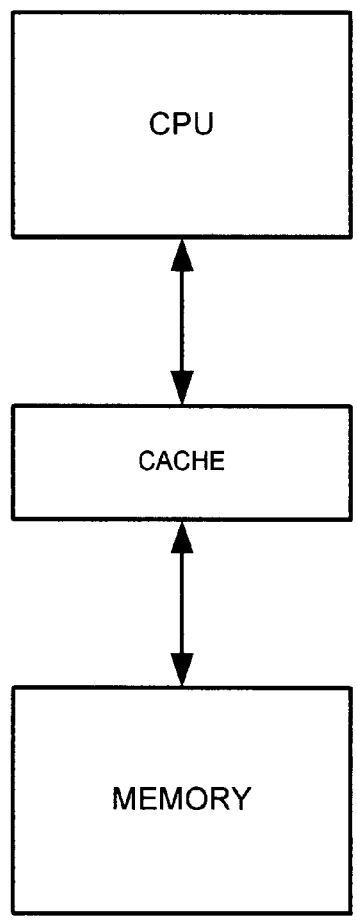
FIG. 1 is a functional block diagram depicting a conventional hierarchical memory system.
Figure 2:
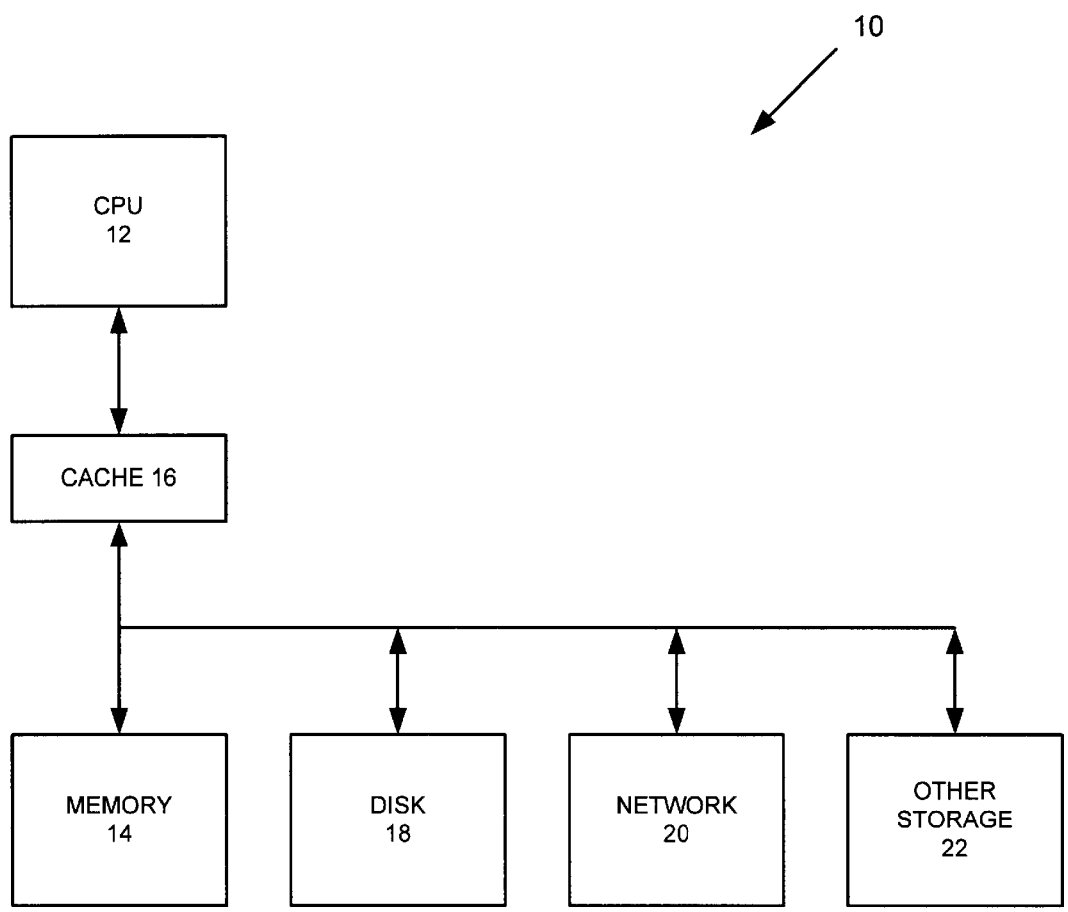
FIG. 2 is a functional block diagram depicting an illustrative hierarchical memory system suitable for use with the present invention.
Figure 3:
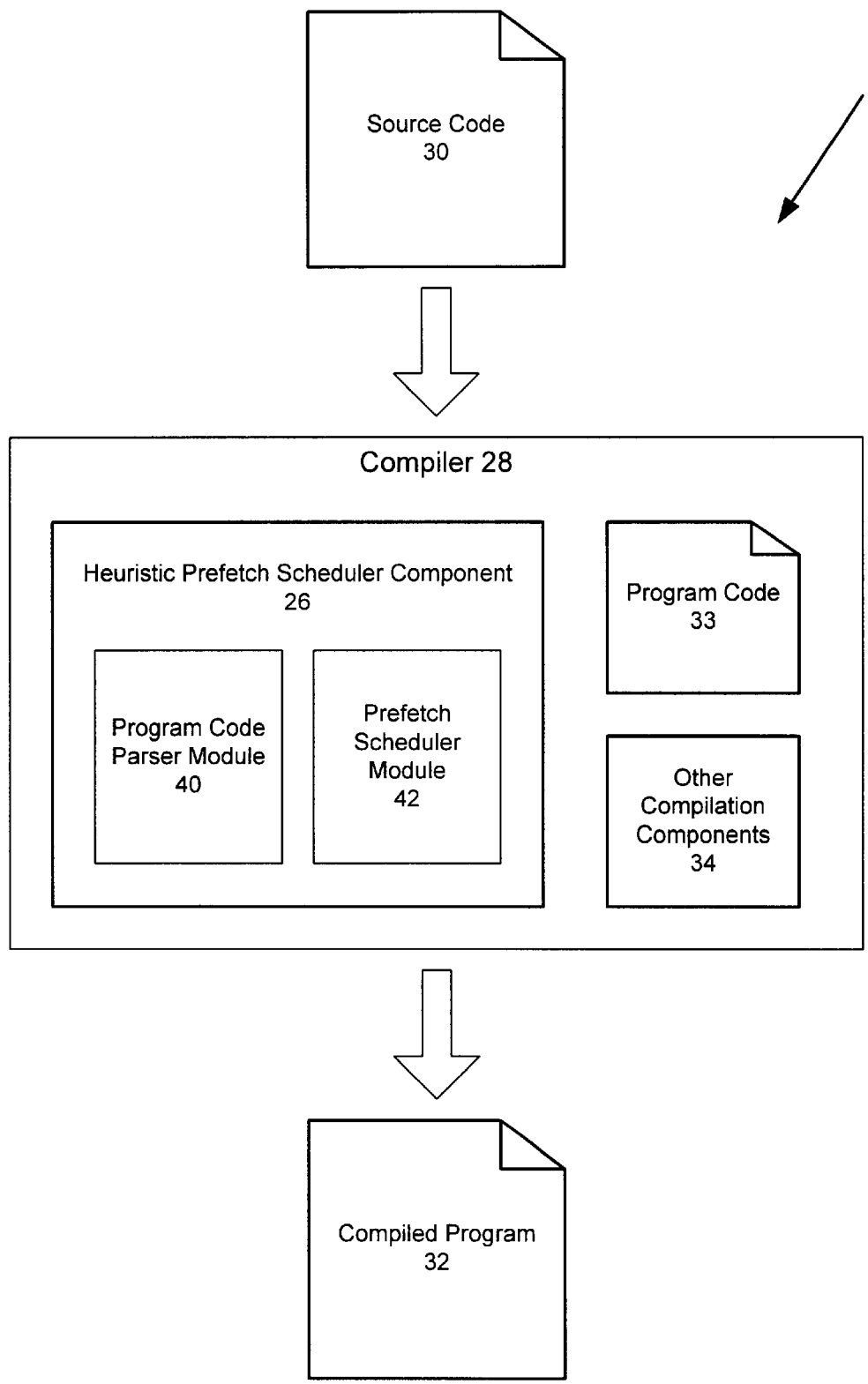
FIG. 3 is a functional block diagram depicting a compilation process using the heuristic prefetch scheduler component software of the present invention.
Figure 4:
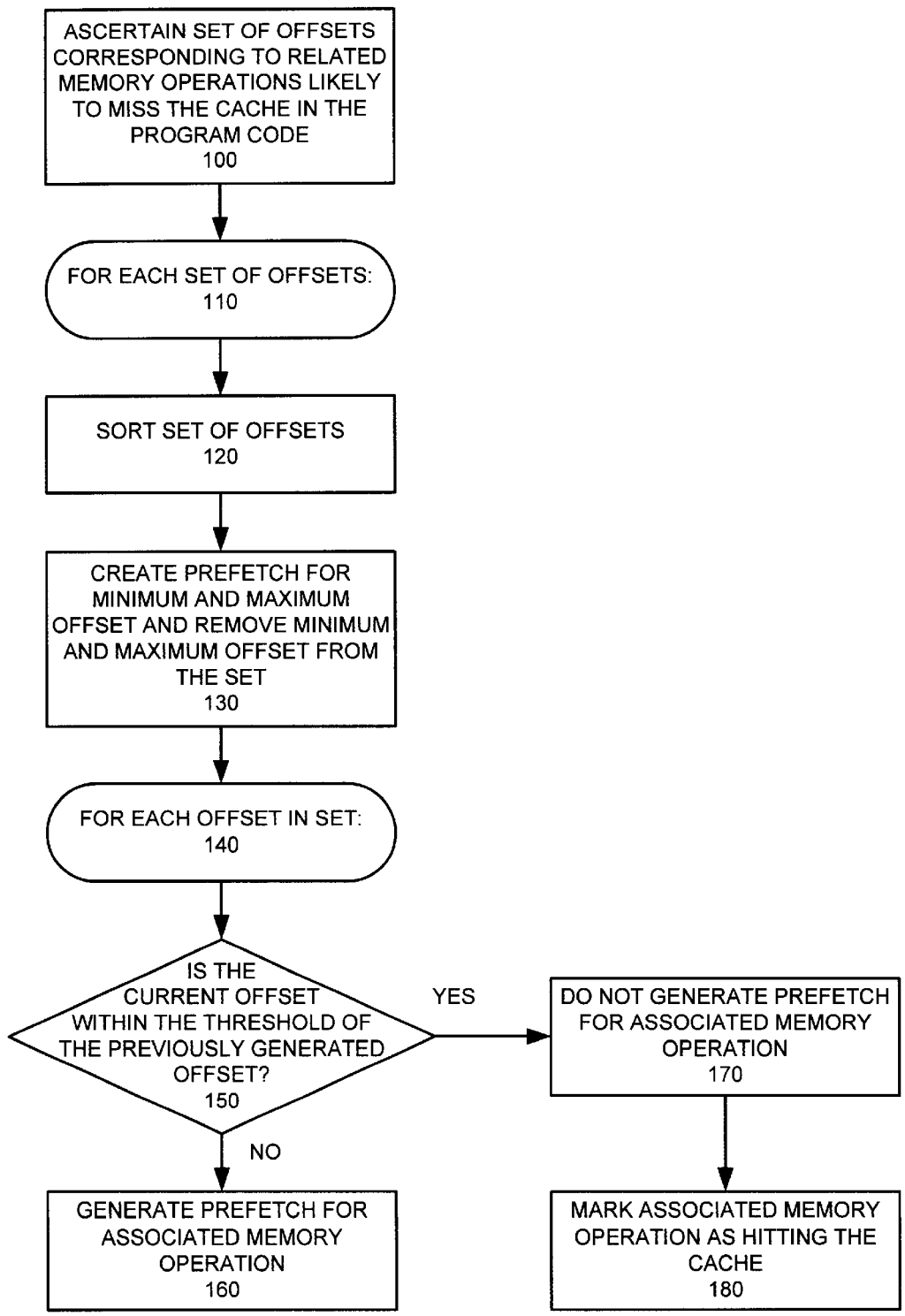
FIG. 4 is a logical flow diagram showing generally the general process associated with heuristic prefetch scheduler component in accordance with the present invention.

Referring more specifically to the drawings, for illustrative purposes the present invention is embodied in the apparatus shown FIG. 2 through FIG. 3 and the method outlined in FIG. 4. It will be appreciated that the apparatus may vary as to configuration and as to details of the parts, and that the method may vary as to details and the order of the steps, without departing from the basic concepts as disclosed herein. The invention is disclosed generally in terms of heuristic algorithm for scheduling prefetches during program compilation, although numerous other uses for the invention will suggest themselves to persons of ordinary skill in the art.

Referring first to FIG. 2, there is generally shown a functional block diagram of an illustrative hierarchical memory system 10 suitable for use with the present invention. As described above and in further detail below in conjunction with FIG. 4, the invention schedules/inserts prefetch instructions according to sets of address offsets associated with related memory operations during compilation. The compiled program is optimized for execution or operation on such as system 10.

System 10 includes a CPU 12 which carries out the execution of the program. System 10 further includes main memory 14 operatively coupled to a cache 16. The cache 16 is operatively coupled to the CPU 12 as is well known in the art. The memory 14 serves as a repository of information in the system 10. The system 10 is further structured and configured to carry out prefetches from the main memory 14 to the cache 16.

Although the invention is described herein with respect to a single cache 16, it is contemplated that any suitable cache arrangement (e.g., various levels of cache) is within the scope of the present invention. Additionally, the present invention may also be suitable for use with a system supporting prefetch instructions from other storage devices into the cache 18. For example, system 10 also shows a disk store 18, a network store 20, and other store 22, each operatively coupled to the cache 16. It is contemplated that the invention may be used for scheduling memory operations from the disk store 18, the network store 20 and/or the other store 22, as well as from the main memory 14 as described herein.

Referring next to FIG. 3, as well as FIG. 2, there is generally shown a functional block diagram of a compilation process 24 using the heuristic prefetch scheduler component software 26 of the present invention. In general, a compiler 28 is provided to translate or convert a source code file 30 into a compiled program 32 suitable for execution by the CPU 12. During compilation, the source code 30 is converted into an intermediary program file 33 which is processed by compiler. The compiler 28 includes the prefetch scheduler component software 26 of the present invention. The compiler 30 further includes other compilation components 34 for carrying other compilation tasks as is known in the art. The compiler 28 is suitable for execution on a conventional data processing means or computer (not shown).

The heuristic prefetch scheduler component 26 comprises a program code parser module 40 and a prefetch scheduler module 42, each operatively coupled to the program code 33. The heuristic prefetch scheduler component 26 may be scheduled to run before, after or during (in conjunction with) one or more of the other compilation processes as carried out by the components 34. The present invention may be employed multiple times, if desired, to optimize the program code during the compilation process.

The program code parser module 40 first processes the program code 33 to ascertain "related" memory operations and their associated prefetch instructions, if any. In particular, the program code parser module 40 examines for "related" memory operations which are likely to miss the cache because memory operations likely to hit the cache are not generally associated with prefetches. Various algorithms known in the art for determining memory operations likely to miss the cache may be implemented with the program code parser module 40.

The program code parser module 40 determines "related memory operations" by inspecting base addresses and constant value offsets. For example, an illustrative portion of code is provided in Listing 1, below.

L1 ld [r3], r5

L2 ld [r5], r3

L3 ld [r1], r2

L4 ld [r3], r4

L5 ld [r3+4], r6

Listing 1.

According to the invention, a first memory operation is related to a second memory operation, if the "distance" between the addresses referenced by the memory operations is determinable to be fixed (i.e., some constant). In Listing 1, operations "ld [r3], r4" at L4 and "ld [r3+4], r6" at L5 are related because there is a fixed distance (4) between the base address ([r3]) referenced by both operations. The fixed distance (4) is also referred to as an "offset". It will be appreciated by those skilled in the art that constant values as well as literal values may be used to make this determination. Referring again to Listing 1, operation "ld [r3], r5" at L1 is not related to either operations "ld [r3], r4" and "ld [r3+4], r6" of L4, and L5 respectively, because the base address [r3] is redefined at L2 by the operation "ld [r5], r3" thus making the distance between "ld [r3], r5" and either of "ld [r3], r4" and "ld [r3+4], r6" indeterminable.

It is noted that a program code 33 may include zero or more such related memory operations. For each set of related memory operations, the program code parser module 40 generates a set of "offsets" (i.e., the fixed distances between the memory operations). For the portion of code in Listing 2, although only illustrative, the program code parser module 40 generates the set {0, 4}, where the 0 offset relates to operation "ld [r3], r4" at L4 while the 4 offset relates to the operation "ld [r3+4], r6" at L5. These sets of offsets are then processed by the prefetch scheduler module 42.

An alternative embodiment of the algorithm splits the set into multiple sets if there is a gap in the set of offsets greater than a cache line size. For example, if the cache line size is 64 bytes, and there are no offsets between four (4) and seventy (70), then the set of offsets is split into two sets where the offsets less than or equal to 4 are in one set and the offsets greater than or equal to 70 are in the other set. This splitting process is continued until no further gaps (greater than the cache line size) are in any of the sets.

As described above, the heuristic algorithm of the present invention utilizes the concept of a "cache line". Since the size of the cache line is generally larger than the size of the data requested during a memory instruction, there may be cases where two or more related memory instructions may reference data in the same cache line, in which case, it may be unnecessary to prefetch data for some memory instructions when an earlier prefetch for a "related" memory instruction has already been carried out.

For each set of offsets, the prefetch scheduler module 42 carries out the heuristic algorithm of the present invention to identify memory operations "guaranteed" to hit the cache as well as to define a "minimal" set of prefetches to insert. This process is described in further detail in FIG. 4 below. In general, the prefetch scheduler module 42 creates a prefetch for the memory operation associated lowest (minimum) offset value in the set and for the memory operation corresponding to the highest (maximum) offset value in the set. The prefetch scheduler module 42 then iterates through the set to define zero or more other prefetches as described herein.

The prefetch scheduler module 42 preferably sorts the set of offsets, normally in ascending order, although the invention may also be practiced without sorting the set of offsets. Once sorted, the offset values in the set of offsets are compared against the previously generated prefetch. It is noted that the minimum and maximum offset values in the set already have prefetches defined. Initially, the "previously generated prefetch" used for comparison is the minimum offset value. If the prefetch scheduler module 42 determines that the current offset under consideration is greater than the previously generated prefetch by a given threshold, a prefetch is defined for the memory operation associated with the current offset. In one version of the algorithm, the prefetch defined for the current offset is at the address of the offset. In another version of the algorithm, the prefetch defined for the current offset is at the previously generated prefetch address plus the threshold. Memory operations associated with offsets that are not greater than threshold are marked as "hitting" the cache on the basis that the previous prefetch would bring the requisite data into the cache line, thereby eliminated unnecessary prefetches. This process is carried out for each set of offsets generated by the program code parser module 40. As described above, the size of the threshold value may be heuristically derived and does not exceed twice the size of the cache line or twice the amount of data fetched by a prefetch.

The method and operation of invention will be more fully understood with reference to the logical flow diagram of FIG. 4, as well as FIG. 2 and FIG. 3. The order of actions as shown in FIG.4 and described below is only exemplary, and should not be considered limiting.

At box 100, the program code parser module 40 examines the program code 33 to ascertain sets of offsets, each set of offsets corresponding to related memory operations likely to miss the cache. As described above, memory operations are related if the addresses referenced by the memory operations are fixed at a determinable distance (constant). For illustrative purposes only, an example set of offsets is provided herein as {0, 6, 16, 128, −12}. According to the alternative embodiment of the invention, if the threshold value is sixteen (16), the set {0, 6, 16, 128, −12} would be split into two sets {0, 6, 16, −12} and {128} as noted above. This process of splitting the set tends to improve the number of cache hits with some increase in the number of prefetches generated. Process 110 is then carried out.

At process 110, a process structure, such as a loop, is implemented to carry out the processes of boxes 120 through 180 for each set of offsets generated during box 100.

At box 120, the set of offsets is sorted, normally in ascending order although, as noted above, the heuristic algorithm may also be carried out without sorting the set of offsets by modifying the heuristic algorithm as would be readily apparent to one skilled in the art having the benefit of this disclosure. The resulting sorted set using the example set given above in box 100 is {−12, 0, 6, 16, 128}. Box 130 is then carried out.

At box 130, a prefetch is created for the memory operation associated with the minimum offset value in the set, and a prefetch is created for the memory operation associated with the maximum offset value in the set. In the example set above, a prefetch would be created for the memory instructions corresponding to offset −12 (minimum) and offset 128 (maximum). The minimum and maximum offsets are then removed from the set. Initially the minimum (−12) is set to the "previously generated offset" for purposed of comparison in diamond 150 below. Process 140 is then carried out.

At process 140, a process structure, such as a loop, is implemented to carry out the processes of diamond 150 through box 180 below for each offset in the set of offsets.

At diamond 150, the prefetch scheduler module 42 determines whether the current offset under consideration is within the threshold of the previously generated offset. For example, if the threshold is sixteen (16), offset "0" would be within the threshold of the previously generated offset (initially −12). A simple way to make this determination is to determine if (the current offset) is less than the previous offset plus the threshold value). If so, the current offset is within the hreshold of the previously generated offset. Otherwise, the current offset is not ithin the threshold of the previously generated offset. In the example above, 0 would be less than the previously generated offset 4 (i.e., −12+16). Thus "0" would be within the threshold of the previously generated offset. However, offset "6", which is not less than the previously generated offset 4 (i.e.,−12+16), and thus would not be within the threshold of the previously generated offset. If current offset under consideration is within the threshold of the previously generated offset, box 170 is then carried out. Otherwise box 160 is carried out.

At box 160, a prefetch is generated for memory operation associated with the current offset under consideration. With the example values discussed above, a prefetch is generated for the memory operation corresponding to offset "6" because "6" was not within the threshold of the previously generated offset (−12). In this case, offset "6" becomes the "previously generated offset" for purposes of evaluating the next offset "16" in the set. It is noted that offset "6" was the "smallest" offset not within the threshold, because the set of offsets was sorted.

According to an alternative embodiment of the algorithm, a prefetch is generated which corresponds to the previous offset plus the threshold exactly or "4" (i.e., −12+16) and then "4" becomes the "previously generated offset" for purposes of evaluating the succeeding offset in the set. This alternative version will guarantee all offsets in the set get prefetched (i.e., all cache lines spanned by the set of offsets are prefetched) with some increase in the number of prefetches generated.

It is noted that memory operations that have prefetches associated can now also be marked as hitting the cache.

At box 170, a prefetch is not generated for the offset which is within the previously generated offset on the basis that the previous prefetch would bring the requisite data into the cache line for the memory operation associated with the current offset. Box 180 is then carried out.

At box 180, the memory operation associated with the current offset is marked as hitting the cache.

Processing as described herein is carried out for each offset in each set of sets. The resulting prefetches are considered the "minimal" number of prefetches to optimize the code using the heuristics of the invention. Memory operations marked as hitting the cache are considered "guaranteed" to hit the cache according to the heuristics of the invention.

Accordingly, it will be seen that this invention provides a heuristic algorithm which identifies loads guaranteed to hit the processor cache which further provides a "minimal" set of prefetches which are scheduled/inserted during compilation of a program to thereby optimize the program code under consideration. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for scheduling memory operations into a program, said program executable in a device having a processor operatively coupled to a cache memory and to a main memory, said processor having a cache line size associated with memory operations, said method comprising:

defining a threshold value;

ascertaining a set of offsets corresponding to related memory operations in the program;

sorting said set of offsets, said offsets including a maximum offset and a minimum offset, wherein said minimum offset initially defines the previously generated offset;

creating a prefetch for the memory operation associated with the maximum offset in the set of offsets;

creating a prefetch for the memory operation associated with the minimum offset in the set of offsets; and creating a prefetch for an offset within said set of offsets, other than said maximum offset and said minimum offset, which is not within the threshold value of the previously generated offset.

2. The method of claim 1, wherein said related memory operations include a base address and an offset value, each said related memory operation having the same base address.

3. The method of claim 1, wherein said offset within said set of offsets is not within the threshold value of the previously generated offset if said offset is not less than the previously generated offset plus said threshold value.

4. The method of claim 1, wherein said threshold value is less than twice the cache line size.

5. The method of claim 1, wherein said threshold value is less than twice the size of data retrieved by the corresponding memory operation associated with the offset under consideration.

6. The method of claim 1, wherein said minimum and maximum offsets are removed from said set of offsets before said creating a prefetch for each offset within said set of offsets which is not within the threshold value of the previously generated offset.

7. The method of claim 1, wherein said main memory is a disk, said cache memory is a disk cache, and said memory operations are disk accesses.

8. The method of claim 1, wherein said main memory is a network, said cache memory is a network cache, and said memory operations are network accesses.

9. The method of claim 1, wherein said set of offsets does not contain gaps greater than said threshold.

10. The method of claim 9, wherein a gap is a contiguous range of offsets within the overall range of said minimum offset and said maximum offset, none of said offsets within said set of offsets contained within said gap.

11. The method of claim 1, wherein said creating a prefetch for an offset within said set of offsets comprises creating a prefetch at the address corresponding to the smallest offset in said set of offsets that is not within the threshold value of the previously generated offset.

12. The method of claim 1, wherein said creating a prefetch for an offset within said set of offsets comprises creating a prefetch at the address corresponding to the address of said previously generated offset plus said threshold.

13. A program storage device readable by a machine, tangibly embodying a program of instructions executable by the machine to perform a method for scheduling memory operations into a program, said program executable in a device having a processor operatively coupled to a cache memory and to a main memory, said processor having a cache line size associated with memory operations, said method comprising:
- defining a threshold value;
- ascertaining a set of offsets corresponding to related memory operations in the program;
- sorting said set of offsets, said offsets including a maximum offset and a minimum offset, wherein said minimum offset initially defines the previously generated offset;
- creating a prefetch for the memory operation associated with the maximum offset in the set of offsets;
- creating a prefetch for the memory operation associated with the minimum offset in the set of offets; and
- creating a prefetch for an offset within said set of offsets, other than said maximum offset and said minimum offset, which is not within the threshold value of the previously generated offset.

14. The program storage device of claim 13, wherein said related memory operations include a base address and an offset value, each said related memory operation having the same base address.

15. The program storage device of claim 13, wherein said offset within said set of offsets is not within the threshold value of the previously generated offset if said offset is not less than the previously generated offset plus said threshold value.

16. The program storage device of claim 13, wherein said threshold value is less than twice the cache line size.

17. The program storage device of claim 13, wherein said threshold value is less than twice the size of data retrieved by the corresponding memory operation associated with the offset under consideration.

18. The program storage device of claim 13, wherein said minimum and maximum offsets are removed from said set of offsets before said creating a prefetch for each offset within said set of offsets which is not within the threshold value of the previously generated offset.

19. The program storage device of claim 13, wherein said main memory is a disk, said cache memory is a disk cache, and said memory operations are disk accesses.

20. The program storage device of claim 13, wherein said main memory is a network, said cache memory is a network cache, and said memory operations are network accesses.

21. The program storage device of claim 13, wherein said set of offsets does not contain gaps greater than said threshold.

22. The program storage device of claim 21, wherein a gap is a contiguous range of offsets within the overall range of said minimum offset and said maximum offset, none of said offsets within said set of offsets contained within said gap.

23. The program storage device of claim 13, wherein said creating a prefetch for an offset within said set of offsets comprises creating a prefetch at the address corresponding to the smallest offset in said set of offsets that is not within the threshold value of the previously generated offset.

24. The program storage device of claim 13, wherein said creating a prefetch for an offset within said set of offsets comprises creating a prefetch at the address corresponding to the address of said previously generated offset plus said threshold.

25. A heuristic prefetch scheduler component apparatus for use in compiling a program, said program executable in a device having a processor operatively coupled to a cache memory and to a main memory, said processor having a cache line size associated with memory operations, said apparatus comprising:
- a program code parser module coupled to said program and configured to ascertain a set of offsets corresponding to related memory operations in the program, said program code parser module further configured to sort said set of offsets, said offsets including a maximum offset and a minimum offset, wherein said minimum offset initially defines the previously generated offset; and
- a prefetch scheduler module coupled to said program and configured to create a prefetch for the memory operation associated with the maximum offset in the set of offsets, said prefetch scheduler module further configured to create a prefetch for the memory operation associated with the minimum offset in the set of offsets, said prefetch scheduler module further configured to create an additional prefetch for each offset within said set of offsets, other than said maximum offset and minimum offset, which is not within the threshold value of the previously generated offset.

26. The apparatus of claim 25, wherein said related memory operations include a base address and an offset value, each said related memory operation having the same base address.

27. The apparatus of claim 25, wherein said offset within said set of offsets is not within the threshold value of the previously generated offset if said offset is not less than the previously generated offset plus said threshold value.

28. The apparatus of claim 25, wherein said threshold value is less than twice the cache line size.

29. The appartus of claim 25, wherein said threshold value is less than twice the size of data retrieved by the corresponding memory operation associated with the offset under consideration.

30. The apparatus of claim 25, wherein said program code parser module is further configured to remove the minimum and maximum offsets from said set of offsets before said prefetch scheduler module creates each said prefetch.

31. The apparatus of claim 25, wherein said main memory is a disk, said cache memory is a disk cache, and said memory operations are disk accesses.

32. The apparatus of claim 25, wherein said main memory is a network, said cache memory is a network cache, and said memory operations are network accesses.

33. The apparatus of claim 25, wherein said set of offsets does not contain gaps greater than said threshold.

34. The apparatus of claim 33, wherein a gap is a contiguous range of offsets within the overall range of said minimum offset and said maximum offset, none of said offsets within said set of offsets contained within said gap.

35. The apparatus of claim 25, wherein said prefetch scheduler module is further configured to create one of said additional prefetches at the address corresponding to the smallest offset in said set of offsets that is not within the threshold value of the previously generated offset.

36. The apparatus of claim 25, wherein said prefetch scheduler module is further configured to create one of said additional prefetches at the address corresponding to said previously generated offset plus said threshold.

* * * * *